United States Patent Office 3,011,904
Patented Dec. 5, 1961

3,011,904
METHOD OF COATING A FLAKE OF NYLON WITH A PIGMENT
James B. Ballentine and Oscar A. Pickett, Decatur, Ala., assignors to The Chemstrand Corporation, Decatur, Ala., a corporation of Delaware
No Drawing. Filed Nov. 25, 1958, Ser. No. 776,186
8 Claims. (Cl. 117—16)

This invention relates to an improved synthetic linear polyamide coated with a pigment and to a method for accomplishing this. More particularly, the invention relates to a new and improved polyamide particle coated with a pigment- and polyamide-containing blend and to a dry method for dispersing pigments on said polyamide particle.

Synthetic linear polyamides are generically referred to as nylon. The polyamides which are useful in the practice of the present invention are of the general types described in U.S. Patents 2,071,250, 2,071,253, and 2,130,948. Accordingly, throughout the instant specification and claims, the terms "synthetic linear polyamides" and "polyamides" designate these general types of polyamides. However, it should be noted that a characteristic property of these polyamides is that they can be formed into fibers which can be cold-drawn into fibers showing molecular orientation along the fiber axis. The polyamides are particularly useful for the preparation of fibers, bristles, sheets, rods, tubes, and the like. The polyamides are of two types, those obtainable from polymerizable monoaminomonocarboxylic acids and their amide-forming derivatives, for example, Epsilon-caprolactam, and those obtainable from the reaction of suitable diamines and suitable dicarboxylic acids or amide-forming derivatives of dibasic dicarboxylic acids. In these polyamides the amide group forms an integral part of the main chain of atoms in the polymer. On hydrolysis with strong mineral acids, the polyamides revert to monomeric polyamide-forming reactants. The polyamides may also be defined as long-chain synthetic polymeric carbonamides which have recurring carbonamide groups as an integral part of the main polymer chain and which are capable of being formed into a filament in which the structural elements are oriented in the direction of the axis of the filament, this definition being patterned rather closely after Wakeman, "The Chemistry of Commercial Plastics," Reinhold Publishing Company (1947), page 257.

In addition to their usefulness in the formation of filaments and fibers, and other shaped articles, the polyamides are useful as molding resins, in coating compositions and lacquers, and as impregnating agents. In all of these uses, herein mentioned, colored polyamides are not only desirable, but necessary in most applications. In the case of shaped articles, such as films, filaments, fibers, etc., coloration is ordinarily obtained by well-known dyeing techniques applied to the shaped article. Practical methods for achieving such coloration in the starting material as a part of the manufacturing operation have long been desired for obvious reasons. Accordingly, many methods to achieve this goal have been proposed but for one reason or another they have not proved to be satisfactory.

For example, one method heretofore proposed is to mix the desired pigment with the monomeric ingredients employed to form the polyamide so that the pigment is present during the condensation reaction and remains in the polyamide when the condensation reaction is completed. One proposed variation of this method is the introduction of the desired pigment into the reaction mass at some stage after condensation has begun and prior to that point in time when the polymerized mass is highly viscous. Still another modification of these two prior processes, and advanced as an improvement over each, is the method in which the condensation reaction is conducted in the presence of a mixture of water, finely divided pigments, and protective colloids. None of these heretofore proposed methods has proved to be completely satisfactory. The major objection in each case has been poor dispersion. This is primarily due to the fact that most dyes are not stable at the high temperatures normally required to prepare the high molecular weight polyamides required to form shaped articles, etc., from the melt. Of practical significance, there are obvious production problems involved in completely cleaning polymerization equipment when new and different pigment dispersions in polyamides are required. Other suggested procedures involve coating polyamide flakes with the desired pigments, melting the coating flakes, and forming filaments or fibers therefrom. These techniques also have not been satisfactory since in many cases the flakes of polyamide are not effectively coated and non-uniform color in the melt-spun fiber or filament results.

Accordingly, it is a primary object of the present invention to provide polyamide particles which contain pigments uniformly dispersed on the surfaces thereof. It is another object of this invention to provide a new process for evenly dispersing pigments in polyamides which does not contaminate or interfere with normal production procedure. It is still another object of the invention to produce a nylon flake which can be readily melt-spun without difficulty to give colored shaped articles, such as filaments, fibers, yarns, threads, and the like, of uniform pigment dispersion and which have outstanding light- and wash-fastness. A further object of this invention is to provide a new and improved dry method for dispersing pigments in polyamides. Other objects and advantages of the instant invention will be apparent from the description thereof hereinafter.

Quite unexpectedly it has been found that the above objects can be readily accomplished by providing a composition of an intimate mixture of a low molecular weight polyamide and pigment, which composition in finely powdered form is in turn employed to coat a polyamide or like particle, preferably of high molecular weight polyamide capable of being spun into filaments which can be cold-drawn or molded into shaped objects. The coated flake is eminently suitable to be melt-spun in standard spinning equipment employing a heated grid to give pigmented polyamide filaments and fibers having a uniform dispersion of pigment therein and improved light- and wash-fastness. The coated particle has a much greater volume than the powdery pigment-polyamide mixture. In ordinary melt spinning of polyamide in which a heated grid is employed, the polyamide flake, chip, granule, or like polymer particle has a volume that is dependent upon the design of the spinning equipment and other process considerations.

In the practice of the present invention, a low viscosity polyamide, for example, polyhexamethylene adipamide, is dispersed in water, a pigment is intimately mixed therewith; and this resulting mixture is dried by known techniques after filtration, if desired. The dried material so obtained, which is comminuted to a powder if needed, is mixed as by tumbling with a polyamide flake, chip, or like particles ordinarily used in melt-spinning that involves the use of a heated grid, to provide a polyamide particle coated with the polyamide-pigmented material or powder. Advantageously, the mixing may be accomplished in a rotating drum or equivalent mixing devices. The coated flakes may then be melt-spun to provide uniformly colored filaments and fibers by extruding the resulting mixture in a molten state through suitable spinnerets, jets, perforated nozzles, and the like into a cooling atmosphere that solidifies the extruded melt into the desired filamentary material. Thereafter, the filamentary material is generally subjected to a stretching operation in order to increase the tenacity as well as otherwise to improve the physical properties of the material. This improvement in properties results from orientation along the filament axis of the polyamide molecules of which the filamentary materials are comprised. In addition to the stretching operation other treating and processing steps may be given the filamentary material, such as for example, crimping, heat-setting, cutting into staple lengths in any desired and advantageous sequence, or the filamentary material may be prepared as continuous filament yarn in endless uninterrupted lengths, which optionally may be twisted into threads or cords before collection as a finished product in a package form. Of course, various lubricants and other beneficial treating agents may be added advantageously to the pigmented filamentary material.

The polyamides contemplated herein are normally obtained from omega-monoaminocarboxylic acids or from dicarboxylic acids and diamines, preferably aliphatic dicarboxylic acids and diamines. Polyamides of present commercial importance are the condensation reaction products of hexamethylene diamine and adipic acid, hexamethylene diamine and sebacic acid, 6-aminocaproic acid, and 11-aminoundecanoic acid. The polyamides are readily obtained by (A) direct reaction of a diamine and a dicarboxylic acid, (B) formation of a salt of a diamine and dicarboxylic acid prior to later condensation, (C) reaction of a diamine with an ester of a dicarboxylic acid, (D) reaction of formyl derivatives of a diamine with a dicarboxylic acid, (E) direct condensation of an amino acid, its ester, or N-formyl derivative, (F) opening of a lactam ring, and (G) reaction of a diisocyanate with a dicarboxylic acid and the like.

Normally, for filament- and fiber-forming polymers, polymethylene diamines of the general formula $$NH_2(CH_2)_xNH_2$$

wherein $x$ is an integer from 2 to 10, and aliphatic dicarboxylic acids of the general formula $$HOOC(CH_2)_xCOOH$$

wherein $x$ is an integer from 2 to 12 are employed to make the polyamides by processes (A) or (B) above.

Obvious variations of these polyamides are well-known to those skilled in the art and the process of this invention is readily applied to any of the high molecular weight polyamides for providing uniformly pigmented and colored plastic compositions suitable for conversion into colored shaped articles.

In preparing the intimate mixture of pigment in low molecular weight polyamides, it is ordinarily preferred that the polyamide employed be the same as, or closely similar, in chemical structure, to the polyamide which is to be pigmented. For example, when nylon 6-6 (polyhexamethylene adipamide) particles are to be pigmented it is preferred that low viscosity nylon 6-6 be employed as the pigment carrier, although any other nylon or polyamide may be employed, such as nylon 6, nylon 6-10, nylon 6-20, nylon 11, and the like.

The polyamide used in preparing the pigment carrier is a low viscosity polyamide which, stated another way, may be considered as a material having now intrinsic viscosity, low relative viscosity, a low degree of polymerization and low molecular weight. For example, the polyamide may have a molecular weight of from about 1000 to less than 10,000, more preferably from 1000 to about 5000; a degree of polymerization of about 5 to less than about 50; and an intrinsic viscosity from about 0.1 to less than about 0.75. However, for more ready preparation of the pigment dispersion, it is preferable to employ a polyamide, such as polyhexamethylene adipamide, having an intrinsic viscosity of 0.05 to about 0.2. Intrinsic viscosity is normally determined by first determining the specific viscosity of a series of solutions of the polymer. Then these data are plotted on a graph and the intrinsic viscosity calculated therefrom. A series of polymer solutions are made up, in concentrations, for example, 0.1, 0.2, 0.3, 0.4, and 0.5 percent by weight; and using a 100 series viscometer tube, the efflux time in seconds is determined for each solution and the solvent used at 25° C. Specific viscosity is then determined as follows:

$$N_{sp} = \frac{\text{efflux time of solution}}{\text{efflux time of solvent}} - 1$$

Then a graph is made in which $N_{sp}$/percent concentration is plotted against percent concentration. A straight line is drawn through the points; and by extrapolating the line to zero concentration, the intrinsic viscosity is determined, i.e., the point at which the extrapolated line crosses the $N_{sp}$/percent concentration axis is taken as the intrinsic viscosity.

The low viscosity pigment carrying polyamide is prepared in the usual manner of preparing any other polyamide, that is, by a condensation reaction; however, the reaction is not carried to completion but rather is stopped, or conducted, under conditions such that less than complete condensation is obtained or such that the polymer has an intrinsic viscosity less than about 0.2. The attainment of the polyamide within this range of condensation is readily accomplished by careful control of polymerization conditions and/or use of monofunctional chain terminators, such as monobasic acids, amines, and the like. No particular precautions are believed to be necessary as long as one obtains the desired polyamide in the hereinbefore defined viscosity range. The pigment-carrying polyamide is not fiber-forming and normally has the appearance and characteristics of a non-resinous material.

An aqueous dispersion of the defined low molecular weight polyamide pigment carrier is prepared by dispersing the polyamide in water. Better results are ordinarily obtained when the polyamide is heated to a liquid state and is extruded under pressure directly into water with vigorous agitation in the presence of a surface-active agent. The concentration of polyamide dispersed in the water may be varied as desired but normally will be from about 10 to about 35 percent by weight. More preferably, the water dispersion of the polyamide will contain from about 15 to 25 percent by weight of the polyamide.

A dispersing agent is preferably present in the water. For obvious reasons, a non-foaming surface-active agent is preferred, although any surface-active agent which may be cation, anion, or non-ion active may be employed. While a great number of such surface-active agents are suitable and available, it is preferred to employ compositions containing the sodium or alkali metal salts of condensed sulfonic acids, as well as Tamol-N, Synthratan-ACA, and the like.

The amount of surface-active agent is not critical although it will be recognized that a minimum amount to obtain a good dispersion will ordinarily be employed. A reasonable range for this purpose will be a concentration of surface-active agents equivalent to about 5 to 25 percent by weight of polyamide present in the dispersion.

The pigments to be dispersed in the polyamide may be any of those which are normally employed in pigmenting polyamides, and in addition, any other pigments which are desired to be incorporated into the polyamide. For example, silicon dioxide, titanium dioxide, phthalocyanine blue, phthalocyanine green, Mercadium Red medium, cadmium sulfide, cadmium selenide, Cibalan Red 2 GL (200%), Monarch Blue, Monastral Blue, Aminoid Dark Blue N, Cibalan Corinth BL (275%), Orange RK-YT-700D, Rouge Aminoid, carbon black, and the like are typical of the pigments which may be employed in the process of this invention. The pigments, however, must be insoluble in water and stable at extrusion temperatures so that the resulting product is not adversely affected. When nylon 6–6 is employed, the pigment should be stable in the nylon melt at 290° C. for about 30 minutes. So far as the instant process, per se, is concerned, the particle size of the pigment is not critical. However, in order to achieve a spinnable product, particularly where fine denier filaments are desired, the particle size should be 0.5 micron or smaller, otherwise the spinneret holes may become clogged or filamentary breaks during spinning may be experienced.

The pigments normally are added to a suspension of the low viscosity polyamide as a water dispersion or paste which may be prepared by ball-milling or the like, and normally will be aqueous dispersions of a concentration of about 15 to about 35 percent by weight of pigments. The amount of pigment employed in relation to the polyamide carrier can be varied over a wide range, but usually about 25 to 75 percent by weight of the pigment based on the weight of the pigment-polyamide blend is satisfactory. Preferably, however, the amount of pigment will range from about 40 to about 60 percent by weight of the pigment based on the weight of the pigment-polyamide blend.

After the pigment and polyamide carrier have been mixed together, they are suitably agitated, such as by high speed mixing, ball-milling, and the like, to obtain an intimate mixture of pigment and polyamide. Thereafter, the mixed pigment and polyamide are separated from the aqueous medium by known separation techniques. For example, the mixture may be spray dried, but more normally will be coagulated by addition to the mixture of a solution of a salt, or vice versa. After the dispersion is broken and the pigment-polyamide composition is coagulated or precipitated, the solid is separated from the aqueous medium. For present purposes, filtration with vacuum or centrifugation has been found to be a very practical mode of separation. Then, the precipitate is washed with water or other suitable non-solvents; thereafter, the product is dried.

The dried product ordinarily will be pulverized to a fine powder that will pass through a 20 mesh screen. Excellent dispersions as determined by laboratory test methods are obtained by the above method. The blend of pigment and polyamide of low molecular weight is non-marking and the pigment particles appear to be coated by polyamide particles.

To use the pigment-polyamide composition in preparing pigmented polyamide, it is necessary only to coat polyamides having the desired molecular weight in a divided form such as flakes, chips, and like particles. This is readily accomplished by tumbling the pigment-polyamide composition with such a polyamide or nylon particle. Normally, the pigment-polyamide composition adheres well to the nylon particle and is uniformly distributed thereover. It may be desirable in some instances to add a small amount of water or a wax that is compatible in the process to the mixture to obtain even better adherence of the pigment-polyamide composition to the particle part, although this is not necessary to the practice of the invention.

The amount of pigment-polyamide employed to coat the polyamide flake or particle depends on the concentration of pigment in said composition and the amount of pigment desired on the coated nylon or polyamide. Normally, the amount of pigment as such so employed will range from about 0.05 to about 4 percent by weight based on the total weight of the coated polyamide with the resulting composition being capable of being spun into fine, colored, filamentary material. However, if desired, concentrations of pigment as low as about 0.01 to as high as 10 percent or more by weight may be employed with satisfactory results. The most useful polyamides are the higher molecular weight polyamides, that is, those having an intrinsic viscosity of 0.4 or above, since they possess the property of being formed into filaments that can be cold-drawn, although the process of the invention is just as applicable to non-fiber-forming polyamides, such as molding resins, coating materials, and the like. Normally, for commercial nylon 6–6, this value ranges from 0.7 to 1.3.

For a more detailed description of the present invention, reference is made to the following specific examples which are merely intended to be illustrative and not limitative. In the examples all parts and percentages are by weight unless otherwise indicated.

*Example I*

Three hundred and fifty-two grams of a 75.9 percent aqueous solution of hexamethylene diamine was added to a solution of 336 grams of adipic acid dissolved in three liters of absolute methanol. A crystallized salt of hexamethylene diammonium adipate was formed which was filtered and washed three times with methanol. The highly crystalline salt had a melting point of 185° C.

Two hundred and thirty-two grams of the hexamethylene diammonium adipate salt was mixed with 77 mls. of distilled water in a stainless steel autoclave. The reaction zone of the autoclave was purged of oxygen by repeated cycles of vacuum and nitrogen at 25 p.s.i.g. After the purging, the autoclave was heated until the contents therein generated an internal pressure of 250 p.s.i.g. and an internal reactant temperature of about 220° C. The pressure was maintained at 250 p.s.i.g. by proper manipulation of heat input but without release of steam. After one hour the pressure in the autoclave was decreased to atmospheric pressure by cooling. The contents of the autoclave were found to be a wet paste of low molecular weight polyhexamethylene adipamide and water. A portion of said paste was vacuum dried, ground into a powder, and examined for dilute solution viscosity characteristics. The intrinsic viscosity was calculated to be 0.12.

The polyhexamethylene adipamide paste, which was found to contain 66 percent solids, was diluted with water by stirring to give a 25 percent solids slurry. To the slurry there was added 10 percent, based on the weight of the solids in the slurry, of a non-foaming detergent called Tamol N (Rohm and Haas Co.). An aqueous paste of phthalocyanine blue pigment was added to the aqueous slurry of the polyhexamethylene adipamide with rapid agitation in such amount as to give a pigment solids content therein equal to the polymer solids content of the slurry. Agitation for 30 minutes with a high speed stirring device was sufficient to disperse the pigment in the polymer slurry.

Three hundred and thirty-two mls. of the pigment-polymer dispersion was coagulated by mixing the same with one liter of an aqueous solution containing 20 grams of aluminum chloride at 80° C. The coagulated solid was filtered and washed thoroughly with boiling water. Thereafter, the washed solid was dried at 50° C. for a period of 50 hours. The solid was then ground to pass a 20 mesh screen.

One hundred and fifty grams of fiber-forming polyhexamethylene adipamide flakes were tumbled with 6 grams of the above-described solid or pigment-polyamide composition for two hours. The pigment-polyamide powder uniformly coated the polyhexamethylene adipamide flake and the adherence thereto was excellent. The coated flakes were melt-spun according to the grid-spinning process without further processing into a monofilament in a regular manner with no difficulties and spinning was continued for a period of 30 minutes without a filament break. The filament had an excellent and homogeneous blue color, and dispersion of the pigment in the filament was visually uniform.

Example II

Three hundred grams of hexamethylene diammonium adipate (nylon 6–6 salt) was intimately mixed with 100 grams of distilled water, with the resulting mixture being placed in an autoclave suitable for condensing the adipate to a high molecular weight polyamide and provided with a heated extrusion nozzle. After the autoclave was purged with nitrogen gas that is substantially free of oxygen to remove the air therein, the autoclave was heated until a pressure of 250 pounds per square inch gauge was attained in the autoclave. The temperature of the autoclave at this pressure was approximately 212° C. These conditions were maintained to form a low molecular weight polyhexamethylene adipamide for one hour with no water being removed from the autoclave during this time.

The end of the extension nozzle was immersed in 1200 mls. of water in a container and the low molecular weight polyhexamethylene adipamide was permitted to be extruded into the water. The pressure within the autoclave was sufficient to accomplish this. The product obtained was composed of finely divided particles of reasonably uniform particle size and had an intrinsic viscosity of 0.10. One hundred grams of phthalocyanine green and 30 grams of Synthratan ACA (Arnold, Hoffman and Co.) were added to and rapidly and vigorously stirred with the mixture composed of the low molecular weight polyamide and water. Agitation for 30 minutes with a high speed stirring device for sufficient time to disperse the pigment therein was employed.

After the solids in the resulting mixture which was comprised of the low molecular weight and the aforesaid pigment were coagulated, they were filtered and washed thoroughly with boiling water. Thereafter, the solid residue was dried in an oven and then comminuted to pass a 20 mesh screen or smaller.

One hundred grams of fiber-forming polyhexamethylene adipamide flakes were tumbled with 12 grams of the powdered pigment-polymer composition described above for two hours. The pigment-polyamide powder uniformly coated the polyhexamethylene adipamide flakes and the adherence thereto was excellent. The coated flakes were melt-spun according to the grid-spinning process without further processing into multifilament yarn having a filament denier of 12 and the spinning was continued for a period of 30 minutes without a filament break. The filaments had an excellent and homogeneous green color, and dispersion of the pigment in yarn was visually uniform.

Example III

The procedure of Example I was repeated except that the hexamethylene diammonium adipate salt was permitted to condense to the extent that the resulting low molecular weight polyhexamethylene adipamide had an intrinsic viscosity of 0.06. Also, instead of the blue pigment, Mercadium Red medium was used in an amount such that the finished filaments produced by the melt-spinning process contained one percent of the pigment by weight. Again, the dispersion of the pigment in the filaments was visually uniform. When the filaments were converted to fabric and the fabric subjected to exposure to light and conventional laundering, it was found that the fastness of the pigment coloration was excellent.

Example IV

The procedure of Example I was repeated except that the hexamethylene diammonium adipate salt was permitted to condense to the extent that the resulting low molecular weight polyhexamethylene adipamide had an intrinsic viscosity of 0.06. Also, instead of the blue pigment, cadmium sulfide was used in an amount such that the aqueous slurry of the polyhexamethylene adipamide contained 2 parts pigment by weight to 1 part polyhexamethylene adipamide by weight. The finished filaments produced by the melt-spinning process contained 0.5 percent of the pigment by weight. Again, the dispersion of the pigment in the filaments was visually uniform and the color resulting from the presence of the pigment in the yarn was fast.

Example V

The procedure of Example I was repeated except that carbon black was used as the pigment in the amount such that the finished filaments contained 2.5 percent of the pigment by weight; the dispersion of the pigment in the filaments was visually uniform and the black color resulting from the presence of the pigment in the yarn was fast.

Example VI

The procedure of Example I was followed to provide a pigment-polyamide composition containing 50 percent Brilliant Blue (also identified as Monastral Blue). Amounts of the pigment-polyamide composition were added to a polyhexamethylene adipate flake so that the resulting compositions contained 0.08 percent, 1 percent, and 1.5 percent of the blue pigment. The compositions were readily melt spun and spinning performance was very good. Color fastness of the yarn so obtained was excellent.

In another modification, prior to mixing the pigment-polyamide composition with the polyhexamethylene adipate flakes, such flakes were tumbled for 5 minutes with a water-wax solution (0.7 gram wax/pound flake) and then the pigment-polyamide composition was sprinkled on the wet flakes and the entire mixture was tumbled for an additional 20 minutes. Adhesion of the pigment-polyamide composition to the flakes was excellent. The wax employed is identified as Atlas G–2152 Wax. These compositions were also readily melt spun to provide colored filaments, fibers, and yarns of good physical properties.

Likewise, similarly excellent results are obtained when the low molecular weight polyamide is prepared from Epsilon-caprolactam, a reaction mixture composed of hexamethylene diamine and sebacic acid, and like polyamide-forming materials of the type referred to above. In addition to the formation of filaments, the instant polyamide particles containing the coating of pigment-low molecular weight polyamide blend can be formed into a variety of useful, colored, shaped objects, for example, bristles, pellicles, ribbons, sheets, and the like and into molded articles, such as those produced by injection molding processes. Numerous other uses of the instant invention will be apparent.

The present invention eliminates many of the disadvantages in the prior art practice of incorporating a pigment in high molecular weight polyamide. The method of the instant invention provides a convenient way of preparing a polyamide chip, flake, and the like that carries a pigment evenly dispersed on its surfaces, with such flake being capable of being spun directly by the melt-spinning process involving a heated grid into filaments having outstanding light- and wash-fastness. By adding the pigment to the polyamide flake, rather than to a polymerized or polymerizable melt, it is possible to conveniently produce relatively small lots of pigmented fibers having different and various pigmentations with conventional and existing equipment.

As many apparently widely different embodiments of this invention may be made without departing from the spirit and scope thereof, it is to be understood that the invention is not limited to the specific embodiments thereof except as defined in the appended claims.

What is claimed is:

1. In the process of dispersing a powdery pigment on the surfaces of a flake of nylon having an intrinsic viscosity of about 0.7 to 1.3 wherein the flake of nylon is tumbled with a powdery pigment, the improvement comprising intimately blending a nylon polymer having the same recurring molecular units of which the said flake is composed but having an intrinsic viscosity of about 0.05 to 0.2 with an insoluble pigment in an aqueous medium, said pigment being present in an amount of 10 to 25 percent by weight based on the weight of the aqueous medium and in an amount of 25 to 75 percent by weight based on the weight of the pigment and said nylon polymer of low intrinsic viscosity, separating and drying the resulting pigment-nylon blend, comminuting the resulting pigment-nylon blend to a powder that passes a 20 mesh screen and thereafter tumbling the said powder with the said nylon flake, whereby the said powder becomes uniformly dispersed on the surfaces of the said nylon flake, said powder being employed in a predetermined quantity such that 0.01 to 10.0 percent by weight of pigment based on the weight of the said nylon flake adheres thereto.

2. In the process of dispersing a powdery pigment on the surfaces of a flake of nylon having an intrinsic viscosity of about 0.7 to 1.3 wherein the flake of nylon is tumbled with a powdery pigment, the improvement comprising flowing a liquid nylon polymer having the same recurring molecular units of which the said flake is composed but having an intrinsic viscosity of about 0.05 to 0.2 into an aqueous medium wherein the nylon polymer of low instrinsic viscosity is solidified in the form of finely divided particles, intimately blending the thus-formed finely divided nylon polymer with an insoluble pigment in the said aqueous medium and in the presence of a surface-active agent, said pigment being present in an amount of 10 to 25 percent by weight based on the weight of the aqueous medium and in an amount of 25 to 75 percent by weight based on the weight of the pigment and said nylon polymer of low intrinsic viscosity, separating and drying the resulting pigment-nylon blend, comminuting the resulting pigment-nylon blend to a powder that passes a 20 mesh screen and thereafter tumbling the said powder with the said nylon flake, whereby the said powder becomes uniformly dispersed on the surfaces of the said nylon flake, said powder being employed in a predetermined quantity such that 0.01 to 10.0 percent by weight of pigment based on the weight of the said nylon flake adheres thereto.

3. The process of claim 2 wherein the nylon flake consists essentially of polyhexamethylene adipamide.

4. The process of claim 2 wherein the nylon flake consists essentially of polymeric 6-aminocaproic acid.

5. The process of claim 3 wherein the pigment is phthalocyanine blue.

6. The process of claim 3 wherein the pigment is phthalocyanine green.

7. The process of claim 3 wherein the pigment is carbon black.

8. The process of claim 3 wherein the pigment is titanium dioxide.

References Cited in the file of this patent

UNITED STATES PATENTS

| | | |
|---|---|---|
| 2,265,127 | Bolton | Dec. 9, 1941 |
| 2,278,878 | Hoff | Apr. 7, 1942 |
| 2,345,533 | Graven | Mar. 28, 1944 |
| 2,480,821 | Connell | Sept. 6, 1949 |
| 2,852,485 | Stott et al. | Sept. 16, 1958 |
| 2,868,757 | Symons | Jan. 1, 1959 |

UNITED STATES PATENT OFFICE

CERTIFICATE OF CORRECTION

Patent No. 3,011,904 December 5, 1961

James B. Ballentine et al.

It is hereby certified that error appears in the above numbered patent requiring correction and that the said Letters Patent should read as corrected below.

Column 2, line 41, after "polyamide" insert -- flake --; column 3, line 64, for "now" read -- low --; column 7, line 17, for "extension" read -- extrusion --.

Signed and sealed this 24th day of April 1962.

(SEAL)
Attest:
ESTON G. JOHNSON
Attesting Officer

DAVID L. LADD
Commissioner of Patents